(12) United States Patent
Oshiumi et al.

(10) Patent No.: US 10,870,812 B2
(45) Date of Patent: Dec. 22, 2020

(54) SURFACE PROTECTION COMPOSITION AND TERMINAL FITTED ELECTRIC WIRE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); KYUSHU UNIVERSITY, Fukuoka (JP); ENEOS CORPORATION, Tokyo (JP)

(72) Inventors: Naoyuki Oshiumi, Yokkaichi (JP); Takehiro Hosokawa, Yokkaichi (JP); Kohei Kobayashi, Yokkaichi (JP); Tetsuya Nakamura, Yokkaichi (JP); Tatsuya Hase, Yokkaichi (JP); Yutaka Takata, Yokkaichi (JP); Makoto Mizoguchi, Fukuoka (JP); Koichi Yoshida, Tokyo (JP); Kenichi Komiya, Tokyo (JP); Yuji Shitara, Tokyo (JP); Kazuhiro Yagishita, Tokyo (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, Fukuoka (JP); ENEOS CORPORATION, Tokyo (JP)

(*) Notice: Subject to any disclaimer, the term of this patent is extended or adjusted under 35 U.S.C. 154(b) by 0 days.

(21) Appl. No.: 16/084,745

(22) PCT Filed: Mar. 8, 2017

(86) PCT No.: PCT/JP2017/009133
§ 371 (c)(1),
(2) Date: Sep. 13, 2018

(87) PCT Pub. No.: WO2017/169579
PCT Pub. Date: Oct. 5, 2017

(65) Prior Publication Data
US 2019/0093042 A1    Mar. 28, 2019

(30) Foreign Application Priority Data
Mar. 29, 2016    (JP) ............................... 2016-065368

(51) Int. Cl.
*C10M 169/06*    (2006.01)
*C09K 21/12*    (2006.01)
(Continued)

(52) U.S. Cl.
CPC ........... *C10M 169/06* (2013.01); *C09K 21/12* (2013.01); *C10M 115/08* (2013.01);
(Continued)

(58) Field of Classification Search
CPC .............. C10M 169/06; C10M 137/04; C10M 137/06; C10M 137/08; C10M 115/08;
(Continued)

(56) References Cited

U.S. PATENT DOCUMENTS

2005/0107269 A1* 5/2005 Yagishita ............. C10M 141/10
                                                              508/440
2009/0291866 A1   11/2009 Kakizaki et al.
(Continued)

FOREIGN PATENT DOCUMENTS

DE    112016006190 T5    10/2018
JP    2008-308587 A      12/2008
(Continued)

OTHER PUBLICATIONS

English Translation of WO 2009153938 from https://worldwide.espacenet.com/patent/search/family/041433862/publication/WO2009153938A1?q=2009153938 (Year: 2009).*
(Continued)

Primary Examiner — Andrew J. Oyer
(74) Attorney, Agent, or Firm — OliffPLC

(57) ABSTRACT

A surface protection composition which is hard to deform or flow even placed under environments of a large temperature change with an external physical load such as pressure, and which stably protects a metal surface. A terminal fitted electric wire coated with the composition. The surface protection composition contains a high-consistency material (A) containing a lubricant base oil and an amide compound, and a phosphorus composition (B). The phosphorus composition (B) contains a composition (b1) containing one or more compounds represented by the general formulae (1) and (2) and one or more metals and/or one or more amines. The phosphorus composition (B) also contains one or more compounds (b2) represented by the general formula (3).

10 Claims, 2 Drawing Sheets

(51) Int. Cl.

| | | |
|---|---|---|
| H01B 7/28 | (2006.01) | |
| H01R 4/18 | (2006.01) | |
| H01R 4/70 | (2006.01) | |
| C10M 137/04 | (2006.01) | |
| C10M 137/06 | (2006.01) | |
| C10M 137/08 | (2006.01) | |
| C10M 115/08 | (2006.01) | |
| H01B 7/00 | (2006.01) | |
| C23F 11/00 | (2006.01) | |
| C10M 137/02 | (2006.01) | |
| C10M 137/10 | (2006.01) | |
| C10N 30/12 | (2006.01) | |
| C10N 50/10 | (2006.01) | |

(52) U.S. Cl.
CPC ........ *C10M 137/04* (2013.01); *C10M 137/06* (2013.01); *C10M 137/08* (2013.01); *H01B 7/2806* (2013.01); *H01R 4/185* (2013.01); *H01R 4/70* (2013.01); C10M 137/02 (2013.01); C10M 137/10 (2013.01); C10M 2203/003 (2013.01); C10M 2215/28 (2013.01); C10M 2223/04 (2013.01); C10M 2223/041 (2013.01); C10M 2223/042 (2013.01); C10M 2223/043 (2013.01); C10N 2030/12 (2013.01); C10N 2050/10 (2013.01); C23F 11/00 (2013.01); H01B 7/00 (2013.01); H01B 7/28 (2013.01)

(58) Field of Classification Search
CPC .............. C10M 137/02; C10M 137/10; C10M 2203/003; C10M 2215/28; C10M 2223/04; C10M 2223/041; C10M 2223/042; C10M 2223/043; C09K 21/12; H01B 7/2806; H01B 7/00; H01B 7/28; H01R 4/185; H01R 4/70; C23F 11/00; C10N 2230/12; C10N 2250/10
See application file for complete search history.

(56) References Cited

U.S. PATENT DOCUMENTS

| | | | |
|---|---|---|---|
| 2010/0093568 A1* | 4/2010 | Tagawa | ................ C10M 101/02 508/133 |
| 2010/0256027 A1 | 10/2010 | Miyamoto et al. | |
| 2015/0133353 A1 | 5/2015 | Arai et al. | |
| 2017/0062954 A1 | 3/2017 | Hase et al. | |
| 2017/0117650 A1 | 4/2017 | Yoshida et al. | |
| 2018/0362876 A1 | 12/2018 | Takata et al. | |

FOREIGN PATENT DOCUMENTS

| | | |
|---|---|---|
| JP | 2011-105831 A | 6/2011 |
| JP | 4811408 B2 | 11/2011 |
| JP | 5383678 B2 | 1/2014 |
| JP | 2014-177608 A | 9/2014 |
| JP | 2015-108181 A | 6/2015 |
| JP | 2015-151614 A | 8/2015 |
| JP | 2016-145375 A | 8/2016 |
| JP | 2017-02302 A | 1/2017 |
| WO | 2008/007671 A1 | 1/2008 |
| WO | 2009/022629 A1 | 2/2009 |
| WO | 2009/153938 A1 | 12/2009 |
| WO | 2013/183676 A1 | 12/2013 |
| WO | 2015/146985 A1 | 10/2015 |
| WO | 2016/199569 A1 | 12/2016 |

OTHER PUBLICATIONS

Nov. 26, 2019 Office Action issued in German Patent Application No. 112017001813.7.
May 23, 2017 International Search Report issued in International Patent Application No. PCT/JP2017/009133.
Jul. 2, 2019 Office Action issued in Japanese Application No. 2018-508886.

* cited by examiner

SURFACE PROTECTION COMPOSITION AND TERMINAL FITTED ELECTRIC WIRE

TECHNICAL FIELD

The present invention relates to a surface protection composition and a terminal fitted electric wire, and more specifically, to a surface protection composition excellent in anticorrosion property for preventing metal corrosion, and a terminal fitted electric wire excellent in anticorrosion property treated with the composition.

BACKGROUND ART

For metal equipment and metal parts, grease is used for the purpose of lubrication and corrosion resistance. For example, Patent Literature 1 describes the use of grease containing a perfluoroether base oil, a consistency improver, barium sulfate, or antimony oxide to machinery parts. Patent Literature 2 proposes the use of a surface treatment agent containing 30 to 95 mass % of a volatile liquid having a boiling point of 300° C. or lower, 1 to 50 mass % of a lubricant oil and/or an anticorrosive agent, and 0.1 to 50 mass % of a compound containing an amide group. Patent Literature 3 describes coating of a metal surface with a composition containing an adduct between an alkyl acid phosphate and a metal, and a base oil.

CITATION LIST

Patent Literature

Patent Literature 1: JP 4811408 B
Patent Literature 2: WO 2009/022629 A
Patent Literature 3: JP 2015-151614 A

SUMMARY OF INVENTION

Problems to be Solved by the Invention

The grease disclosed in Patent Literature 1 shows poor adhesion to the metal. Especially, under the high temperature conditions, the grease is likely to leak from the metal surface, and thus difficulty arises in protecting the metal surface stably. This is presumably because that the grease of Patent Literature 1 is not chemically bonded with the metal surface, but it merely adheres to the metal surface through Van der Waals force, which provides weaker adsorption. The surface treatment agent in Patent Literature 2 also shows poor adhesion to a metal. Especially, under high temperature environments, the surface treatment agent is likely to leak from the metal surface, and thus is hard to protect the metal surface stably. The surface treatment agent in Patent Literature 2 may deform or flow when the agent is placed in an environment of a large temperature change with an external load such as pressure, and thus it can not stably protect the metal surface. The composition in Patent Literature 3 also may deform or flow when the composition is placed in an environment of a large temperature change with an external load such as pressure, and thus it can not stably protect the metal surface.

It is an object of the present invention to provide a surface protection composition which is hard to deform or flow even placed under environments of a large temperature change with an external load such as pressure, and which stably protects a metal surface, and a terminal-fitted electric wire treated with the composition.

Solution to Problem

In order to solve the foregoing problem the surface protection composition contains a high-consistency material (A) containing a lubricant base oil and an amide compound; and a phosphorus composition (B). The phosphorus composition contains a composition (b1) containing one or more selected from compounds represented by the general formulae (1) and (2) and one or more metals and/or one or more amines; and one or more compounds (b2) represented by the general formula (3):

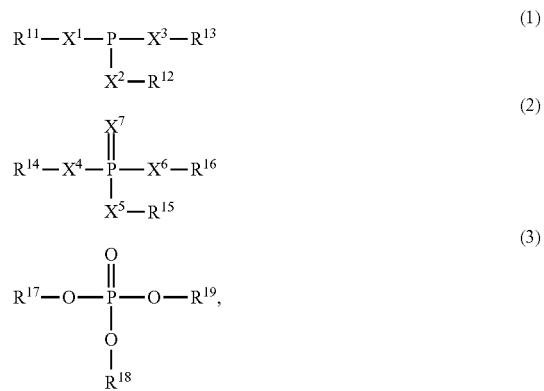

where $X^1$ to $X^7$ each represent independently an oxygen atom or a sulfur atom, $R^{11}$ to $R^{13}$ each represent independently a hydrogen atom or a hydrocarbon group having 1 to 30 carbon atoms, among which at least one is a hydrocarbon group having 1 to 30 carbon atoms and at least one is a hydrogen atom, $R^{14}$ to $R^{16}$ each represent independently a hydrogen atom or a hydrocarbon group having 1 to 30 carbon atom, among which at least one is a hydrocarbon group having 1 to 30 carbon atom and at least one is a hydrogen atom, and $R^{17}$ to $R^{19}$ each represent independently a hydrocarbon group having 1 to 25 carbon atoms.

The compound (b2) preferably has a lower molecular weight than the composition (b1).

The amide compound preferably contains one or more selected from compounds represented by the general formulae (4) to (6):

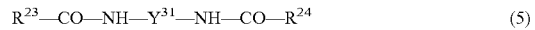

where $R^{21}$ to $R^{26}$ each represent independently a saturated or unsaturated linear hydrocarbon group having 5 to 25 carbon atoms except that $R^{22}$ may be hydrogen, and $Y^{31}$ and $Y^{32}$ each represent a divalent hydrocarbon group having 1 to 10 carbon atoms selected from an alkylene group and a phenylene group having 1 to 10 carbon atoms, or an alkylphenylene group having 7 to 10 carbon atoms.

The amide compound is preferably a fatty acid amide having a melting point within a range of 20° C. to 200° C.

The compound represented by the general formulae (1) and (2) preferably has one or more branched structures or one or more carbon-carbon double bond structures in the structure of the hydrocarbon groups.

The metal in the composition (b1) is preferably at least one selected from alkali metals, alkaline earth metals, aluminum, titanium, and zinc.

The composition (b1) preferably has a molecular weight of 3000 or lower.

The mass ratio (A):(b1) of the high-consistency material (A) to the composition (b1) is preferably within a range of 30:70 to 98:2.

The mass ratio {(A)+(b1)}:(b2) of the total of the high-consistency material (A) and the composition (b1) to the compound (b2) is preferably within a range of 70:30 to 99.9:0.1.

The composition preferably covers the surface of a metal component with closely contacting the surface, preventing corrosion of the metal component.

The terminal-fitted electric wire according to the present invention is a wire in which an electric connection part between a terminal and an electric conductor is covered with the surface protection composition.

Advantageous Effects of Invention

The surface protection composition according to the present invention contains the high-consistency material (A) containing the lubricant base oil and the amide compound, and the phosphorus composition (B). The phosphorus composition (B) contains the composition (b1) containing one or more compounds represented by the general formulae (1) and (2) and one or more metals and/or one or more amines, and one or more compounds (b2) represented by the general formula (3). Containing the ingredients, the surface protection composition is hard to deform or flow even placed under environments of a large temperature change with an external load such as pressure, and thus it stably protects a metal surface. This is presumably because the phosphorus composition (B) contains the composition (b1) containing the metal or amine salt, and the compound (b2) not containing a salt such as a metal or amine salt in combination, whereby broadens the range of the temperature in which the amide compound aggregates to form a gel in the surface protection composition. Thus, the network structure of the gel obtains flexibility in a broad range of temperatures, whereby the surface protection composition obtains flexibility in a broad range of temperatures. Consequently, deformation or flowing of the surface protection composition due to expansion or shrinkage of the material may be suppressed even when the composition is placed in an environment of a large temperature change.

When the compound (b2) has a lower molecular weight than the composition (b1), the temperature ranges in which the gel is formed may be further broadened, improving the effect described above.

In the surface protection composition according to the present invention, when the compound represented by the general formulae (1) and (2) has one or more branched structures or one or more carbon-carbon double bond structures in the structure of the hydrocarbon groups, the compatibility of the surface protection composition with the lubricant base oil is improved.

When the metal in the composition (b1) is at least one selected from alkali metals, alkaline earth metals, aluminum, titanium, and zinc, the adhesion of the surface protection composition to a metal surface is improved.

When the composition (b1) has a molecular weight of 3000 or lower, the compatibility of the composition (b1) with the lubricant base oil is improved.

In the terminal-fitted electric wire according to the present invention, an electric connection part between a terminal and an electric conductor is covered with the surface protection composition. Thus, the terminal-fitted electric wire is hard to deform or flow even placed under environments of a large temperature change with an external load such as pressure, and the metal surface of the electric connection part may be protected stably.

DESCRIPTION OF EMBODIMENTS

Figure 1:
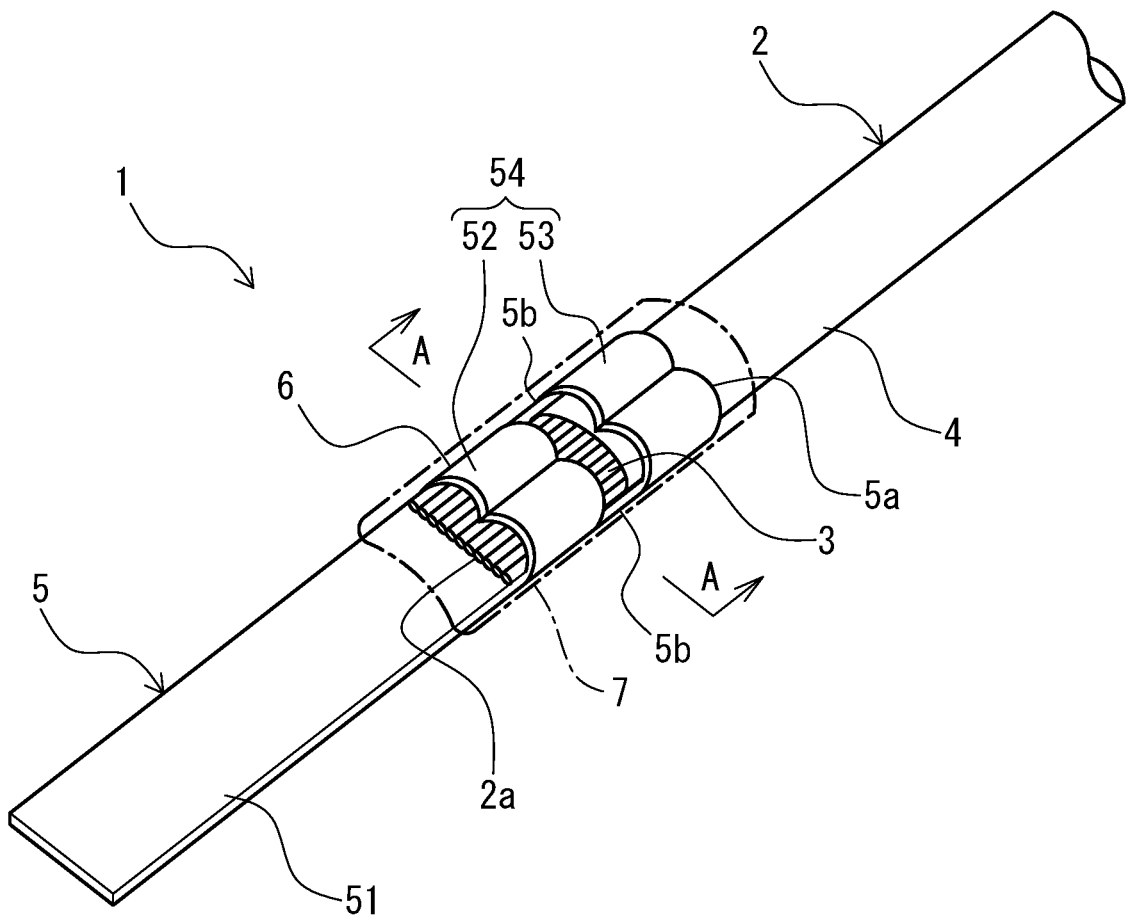
FIG. 1 is a perspective view of a terminal-fitted electric wire according to a preferred embodiment of the present invention.

Next, a preferred embodiment of the present invention is to be described specifically.

The surface protection composition according to the present invention (hereinafter sometimes referred to as the present protection composition) contains a high-consistency material (A) containing a lubricant base oil and an amide compound, and a phosphorus composition (B).

The lubricant base oil used herein includes any one of a mineral oil, a wax isomerized oil, and a synthetic oil, which are usually used as the base oil of a lubricant oil, or a mixture of two or more of them. Specific examples of the mineral oil used herein include paraffinic and naphthenic oils, and n-paraffin, which are purified from lubricant oil fractions obtained by distillation under ordinary pressure or distillation under reduced pressure of crude oils by appropriately combining purification treatments such as solvent deasphaltation, solvent extraction, hydrocracking, solvent dewaxing, catalytic dewaxing, hydrorefining, sulfuric acid cleaning, and white clay treatment of a lubricant oil fractions.

The isomerized oils used herein include any one of those prepared through a hydrogen isomerization treatment of a wax raw material, such as natural wax, e.g., petroleum slack wax obtained through solvent dewaxing of a hydrocarbon oil, or a synthetic wax formed by the so-called Fischer Tropsch synthetic process, in which a mixture of carbon monoxide and hydrogen is brought in contact with a suitable synthetic catalyst at a high temperature and a high pressure. In a case of using the slack wax as the wax raw material, since the slack wax contains large amounts of sulfur and nitrogen, which are unnecessary in the lubricant base oil, it is desirable that the slack wax is hydrogenated as needed to prepare a wax raw material reduced in the sulfur content and the nitrogen content.

Although not particularly limited, examples of the synthetic oil include a poly-α-olefin, such as a 1-octene oligomer, 1-decene oligomer, and ethylene-propylene oligomer or a hydrogenated product thereof, isobutene oligomer and hydrogenated products thereof, isoparaffin, alkylbenzene, alkylnaphthalene, diester (for example, ditridecyl glutarate, di-2-ethylhexyl adipate, diisodecyl adipate, ditridecyl adipate, and di-2-ethylhexyl sebacate), polyol ester (for example, trimethylolpropane caprylate, trimethylolpropane pelargonate, pentaerythritol-2-ethylhexanoate, and pentaerythritol pelargonate), polyoxyalkylene glycol, dialkyl diphenyl ether, polyphenyl ether, etc.

The kinematic viscosity of the lubricant base oil is not particularly limited. Usually, it is preferably from 1 to 150 $mm^2/s$ at 100° C. The kinematic viscosity at 100° C. is more preferably within a range of 2 to 130 $mm^2/s$ because the volatility and the handleability in production are excellent. The kinematic viscosity is measured according to JIS K 2283.

The amide compound forms a network structure by hydrogen bonds in the lubricant base oil. This provides the lubricant base oil with the consistency to be a grease-like high-consistency material. That is, when it is used together with the lubricant base oil, a gel-like product is formed at a normal temperature. That is, the amide compound forms a gel (i.e., a semi-solid) of the liquid lubricant base oil at a normal temperature. The high-consistency material is maintained due to its consistency on the coat surface of the material to be coated at a normal or high temperature.

The amide compound is a compound having one or more amide groups (—NH—CO—), and a mono-amide compound having one amide group or a bis-amide compound having two amide groups can be used preferably.

Compounds, for example, represented by the following general formulae (4) to (6) can be used as the amide compound. They may be used alone or two or more of them may be used in combination.

  (4)

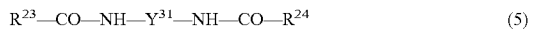  (5)

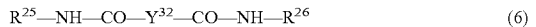  (6)

In the general formulae (4) to (6), $R^{21}$ to $R^{26}$ each represent independently a saturated or unsaturated linear hydrocarbon group having 5 to 25 carbon atoms, provided that $R^{22}$ may be hydrogen; and $Y^{31}$ and $Y^{32}$ each represent a divalent hydrocarbon group having 1 to 10 carbon atoms selected from an alkylene group or a phenylene group having 1 to 10 carbon atoms, and an alkylphenylene group having 7 to 10 carbon atoms. Further, in the general formulae (4) to (6), hydrogen atoms of the hydrocarbon group constituting $R^{21}$ to $R^{26}$ may be partially substituted by a hydroxyl group (—OH).

The amide compound represented by the general formula (4) includes, specifically, a saturated fatty acid amide such as lauric acid amide, palmitic acid amide, stearic acid amide, behenic acid amide, and hydroxystearic acid amide, an unsaturated fatty acid amide such as oleic acid amide and erucic acid amide, and a substituted amide of a saturated or unsaturated long-chain fatty acid and a long-chain amine such as stearylstearic acid amide, oleyloleic acid amide, oleylstearic acid amide, and stearyloleic acid amide. Among them, an amide compound in which at least one of $R^{21}$ to $R^{22}$ in the general formula (4) is a saturated linear hydrocarbon group having 12 to 20 carbon atoms, such as for example, an amide compound in which $R^{21}$ is a saturated linear hydrocarbon group having 12 to 20 carbon atoms and $R^{22}$ is a hydrogen atom in the general formula (4), or an amide compound in which each of $R^{21}$ and $R^{22}$ in the general formula (4) is a saturated linear hydrocarbon group having 12 to 20 carbon atoms is preferred. More specifically, stearylstearic acid amide is preferred.

The amide compound represented by the general formula (5) includes, specifically, ethylenebis-stearic acid amide, ethylene bis-isostearic acid amide, ethylene bis-oleic acid amide, methylene bis-lauric acid amide, hexamethylene bis-oleic acid amide, hexamethylene bis-hydroxystearic acid amide, and m-xylylene bis-stearic acid amide. Among them, an amide compound in which at least one of $R^{23}$ and $R^{24}$ in the general formula (5) is a saturated linear hydrocarbon group having 12 to 20 carbon atoms, such as for example, an amide compound in which $R^{23}$ is a saturated linear hydrocarbon group having 12 to 20 carbon atoms and $R^{24}$ is a hydrogen atom in the general formula (5), or an amide compound in which each of $R^{23}$ and $R^{24}$ is a saturated linear hydrocarbon group having 12 to 20 carbon atoms in the general formula (5) is preferred. More specifically, ethylene bisisostearic acid amide is preferred.

The amide compound represented by the general formula (6) includes specifically, for example, N,N'-distearyl sebacic acid amide. Among them, an amide compound in which at least one of $R^{25}$ and $R^{26}$ in the general formula (6) is a saturated linear hydrocarbon group having 12 to 20 carbon atoms, such as for example, an amide compound in which $R^{25}$ is a saturated linear hydrocarbon group having 12 to 20 carbon atoms and $R^{26}$ is a hydrogen atom in the general formula (6) or an amide compound in which each of $R^{25}$ and $R^{26}$ in the general formula (6) is a saturated linear hydrocarbon group having 12 to 20 carbon atoms is preferred.

From a viewpoint of keeping a gel state (semi-solid state) at a normal temperature when mixed with a lubricant base oil or keeping a gel-state (semi-solid state) alone, the amide compound preferably has a melting point of 20° C. or higher. The melting point is more preferably 50° C. or higher, even more preferably 80° C. or higher, and particularly preferably 120° C. or higher. Further, the melting point is preferably 200° C. or lower, more preferably 180° C. or lower, even more preferably 150° C. or lower. Further, the molecular weight of the amide compound is preferably within a range of 100 to 1000, and more preferably within a range of 150 to 800.

From a viewpoint of keeping the gel-state (semi-solid state) at a normal temperature when mixed with the lubricant base oil or keeping a gel state (semi-solid state) alone at a normal temperature, the content of the amide compound is preferably 1 mass part or more with respect to 100 mass parts of the lubricant base oil. The content is more preferably 2 mass parts or more, and even more preferably 5 mass parts or more. Further, the content is preferably 70 mass parts or less, more preferably 60 mass parts or less, and even more preferably 50 mass parts or less with respect to 100 mass parts of the lubricant base oil. Preferably, the content is 60 mass parts or less, and more preferably 50 mass parts or less.

The phosphorus composition (B) contains a composition (b1) containing one or more compounds represented by the below-presented general formulae (1) and (2) and one or more metals and/or one or more amines, and one or more compounds (b2) represented by the general formula (3). The composition (b1) has a metal adhesion property to bond ionically with the metal atoms of the metal surface on which the present protection composition is applied.

Examples of the composition (b1) include a composition containing one or more compounds represented by the general formulae (1) and (2) and a metal; a composition containing one or more compounds represented by the general formulae (1) and (2) and an amine; and a composition containing one or more compounds represented by the general formulae (1) and (2), a metal, and an amine. Among them, a composition containing a metal is preferred from a viewpoint of adhesion.

  (1)

  (2)

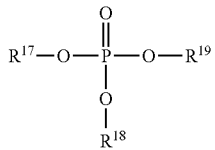

(3)

where $X^1$ to $X^7$ each represent independently an oxygen atom or a sulfur atom, $R^{11}$ to $R^{13}$ each represent independently a hydrogen atom or a hydrocarbon group having 1 to 30 carbon atoms, among which at least one is a hydrocarbon group having 1 to 30 carbon atoms and at least one is a hydrogen atom, $R^{14}$ to $R^{16}$ each represent independently a hydrogen atom or a hydrocarbon group having 1 to 30 carbon atom, among which at least one is a hydrocarbon group having 1 to 30 carbon atom and at least one is a hydrogen atom, and $R^{17}$ to $R^{19}$ each represent independently a hydrocarbon group having 1 to 25 carbon atoms.

Examples of the hydrocarbon group include alkyl group, cycloalkyl group, alkyl-substituted cycloalkyl group, alkenyl group, aryl group, alkyl-substituted aryl group, and aryl alkyl group.

Examples of the alkyl group include methyl group, ethyl group, propyl group, butyl group, pentyal group, hexyl group, heptyl group, octyl group, nonyl group, decyl group, undecyl group, dodecyl group, tridecyl group, tetradecyl group, pentadecyl group, hexadecyl group, heptadecyl group, and octadecyl group. They may be either linear or branched.

Examples of the cycloalkyl group include cyclopentyl group, cyclohexyl group, and cycloheptyl group. Examples of the alkyl-substituted cycloalkyl group include methylcyclopentyl group, dimethylcyclopentyl group, methylethylcyclopentyl group, diethylcyclopentyl group, methylcyclohexyl group, dimethylcyclohexyl group, methylethylcyclohexyl group, diethylcyclohexyl group, methylcycloheptyl group, dimethylcycloheptyl group, methylethylcyclopeptyl group, and diethylcycloheptyl group. The substitution position of the alkyl-substituted cycloalkyl group is not particularly restricted. The alkyl group may be linear or branched.

Examples of the alkenyl group include butenyl group, pentenyl group, hexenyl group, heptenyl group, octenyl group, nonenyl group, decenyl group, undecenyl group, dodecenyl group, tridecenyl group, tetradecenyl group, pentadecenyl group, hexadecenyl group, heptadecenyl group, and octadecenyl group. They may be either linear or branched.

Examples of the aryl group include phenyl group, and naphthyl group. Examples of the alkyl-substituted aryl group include tolyl group, xylyl group, ethylphenyl group, propylphenyl group, butylphenyl group, pentylphenyl group, hexylphenyl group, heptylphenyl group, octylphenyl group, nonylphenyl group, decylphenyl group, undecylphenyl group and dodecylphenyl group. The substitution position of the alkyl substituted aryl group is not particularly restricted. The alkyl group may be linear or branched. The arylalkyl group includes, for example, benzyl group, phenylethyl group, phenylpropyl group, phenylbutyl group, phenylpengyl group, and phenylhexyl group. The alkyl group may be linear or branched.

All of $X^1$ to $X^7$ are preferably oxygen atoms. The hydrocarbon groups $R^{11}$ to $R^{16}$ having 1 to 30 carbon atoms are preferably hydrocarbon groups having 4 to 30 carbon atoms, and more preferably hydrocarbon groups having 8 to 30 carbon atoms.

Preferably, at least one of $R^{11}$ to $R^{13}$ is a hydrogen atom and at least another one of them is a hydrocarbon group having 1 to 30 carbon atoms. Preferably, at least one of $R^{14}$ to $R^{16}$ is a hydrogen atom and at least another one of them is a hydrocarbon group having 1 to 30 carbon atoms.

Examples of the compound represented by the general formula (1) include phosphorous acid, monothiophosphorous acid, dithiophosphorous acid, phosphite monoester, monothiophosphite monoester, dithiophosphite monoester, phosphite diester, monothiophosphite diester, dithiophosphite diester, phosphite triester, monothiophosphite triester, and dithiophosphite triester. They may be used alone or two or more of them may be used in combination as the compound represented by the general formula (1).

Examples of the compound represented by the general formula (2) include phosphoric acid, monothiophosphoric acid, dithiophosphoric acid, phosphate monoester, monothiophosphate monoester, dithiophosphate monoester, phosphate diester, monothiophosphate diester, dithiophosphate diester, phosphate triester, monothiophosphate triester, and dithiophosphate triester. They may be used alone or two or more of them may be used in combination as the compound represented by the general formula (2).

Among the compounds represented by the general formulae (1) and (2), the compound represented by the general formula (2) is more preferred from a viewpoint of improving compatibility of the composition (b1) with the high-consistency material (A), improving stickiness of the composition (b1), and improving adhesion of the composition (b1) to a metal surface to be protected. Further, among the compounds represented by the general formula (2), an acidic phosphate ester represented by the below-presented general formula (7) or (8) is particularly preferred.

(7)

(8)

The metal in the composition (b1) includes, for example, an alkali metal such as Li, Na, and K, an alkaline earth metal such as Mg and Ca, aluminum, titanium, zinc, etc. They may be used alone or two or more of them may be used in combination. The metals can provide good adsorption to the metal surface due to their relatively high ionization tendency. Further, since the ionization tendency is, for example, higher than that of Sn, it can be excellent in the ion bondability to Sn. Among them, Ca and Mg are more preferred from a viewpoint for example, of waterproofness. The metal in the composition (b1) preferably has a valence of two or more from a viewpoint of increase of the molecular weight of the composition and heat resistance.

The amine (organic amine) in the composition (b1) is preferably an organic amine compound having a hydrocarbon group having 2 to 100 carbon atoms, from a viewpoint of versatility and viscosity of the composition to be formed, and more preferably an organic amine compound having a hydrocarbon group having 2 to 22 carbon atoms. Any organic amine compounds are preferred among primary, secondary and tertiary organic amine compounds; however a tertiary organic amine compound is more preferred from a viewpoint of basicity and oxidation stability. More specific examples of the organic amine compound include octylamine, laurylamine, myristylamine, stearylamine, behenylamine, oleylamine, tallow alkylamine, hardened tallow alkylamine, aniline, benzylamine, cyclohexylamine, diethylamine, dipropylamine, dibutylamine, diphenylamine, dibenzylamine, dicyclohexylamine, triethylamine, tributylamine, dimethyloctylamine, dimethyldecylamine, dimethylstearylamine, dimethyl tallow alkylamine, dimethyl hardened tallow alkylamine, and dimethyloleylamine. They may be used alone, or two or more of them may be used in combination. Among them, triethylamine is more preferred from a viewpoint of versatility and viscosity of the composition to be formed.

In the composition (b1), when at least one of the hydrocarbon group of the compounds represented by the general formulae (1) and (2) is a hydrocarbon group having 4 to 30 carbon atoms, the compatibility of the composition (b1) with the lubricant base oil, which is the long-chained alkyl compound, is improved. The hydrocarbon group is an organic group containing carbon and hydrogen but not containing heteroelements such as N, O, and S. Then, in view of the compatibility with the lubricant base oil, which is the long-chained alkyl compound, the hydrocarbon group of the compounds represented by the general formulae (1) and (2) is preferably an aliphatic hydrocarbon group or a cycloaliphatic hydrocarbon group. More preferably, it is an aliphatic hydrocarbon group.

The aliphatic hydrocarbon group may be an alkyl group consisting of a saturated hydrocarbon or an alkenyl group consisting of an unsaturated hydrocarbon. The alkyl group or the alkenyl group as the aliphatic hydrocarbon group may be either linear or branched. However, when the alkyl group is a linear alkyl group such as an n-butyl group or n-octyl group, alkyl chains tend to be aligned to each other and increase the crystallinity of the composition of the specific phosphorus composition and the metal, lowering the solubility with the lubricant base oil. In view of the above, when the hydrocarbon group is an alkyl group, a branched alkyl group is more preferred compared to a linear alkyl group. On the other hand, since the alkenyl group has one or more carbon-carbon double bonds, it has not so-high crystallinity even if it has a linear structure. Accordingly, the alkenyl group may either be linear or branched.

When the number of carbon atoms of at least one hydrocarbon group is less than 4, the compounds represented by the general formulae (1) and (2) become inorganic. Further, the compounds represented by the general formulae (1) and (2) tend to increase the crystallinity. Then, it shows poor solubility with the lubricant base oil and is no longer compatible with the lubricant base oil. On the other hand, if the number of carbon atoms of the hydrocarbon group is more than 30, the compounds represented by the general formulae (1) and (2) show excessively high viscosity and tend to lower the fluidity. The number of carbon atoms of the hydrocarbon group is preferably 5 or more and, more preferably, 6 or more from a viewpoint of the compatibility with the lubricant base oil. Further, the number of carbon atoms of the hydrocarbon group is preferably 26 or less and, more preferably, 22 or less from a viewpoint of fluidity, etc.

Further, the composition (b1) has a phosphate group (polar group) and a non-polar group (hydrocarbon group in the ester moiety) together in the molecule, and can be present in a layered state in which polar groups are associated to each other and non-polar groups are associated to each other and, accordingly, the composition (b1) can be a highly viscous liquid even in a non-polymerized state. If it is a viscous liquid, the composition can be adhered more strongly to the metal surface through physical adsorption due to Van der Waals force. The viscosity is presumably obtained by the entanglement caused between linear molecular chains to each other. In view of the above, it is preferred that the composition (b1) is designed not to promote crystallization of the compounds represented by the general formulae (1) and (2). Specifically, for this purpose, the hydrocarbon groups each have 4 to 30 hydrocarbon atoms, have one or more branched chain structures or one or more carbon-carbon double bonds, etc.

More specific examples of the hydrocarbon group include oleyl group, stearyl group, isostearyl group, 2-ethylhexyl group, butyloctyl group, isomyristyl group, isocetyl group, hexyldecyl group, octyldecyl group, octyldodecyl group, and isobehenyl group.

Further, specific examples of the acid phosphate ester include butyloctyl acid phosphate, isomyristyl acid phosphate, isocetyl acid phosphate, hexyldecyl acid phosphate, isostearyl acid phosphate, isobehenyl acid phosphate, octyldecyl acid phosphate, octyldodecyl acid phosphate, isobutyl acid phosphate, 2-ethylhexyl acid phosphate, isodecyl acid phosphate, lauryl acid phosphate, tridecyl acid phosphate, stearyl acid phosphate, oleyl acid phosphate, myristyl acid phosphate, palmityl acid phosphate, di-butyloctyl acid phosphate, di-isomyristyl acid phosphate, di-isocetyl acid phosphate, di-hexyldecyl acid phosphate, di-isostearyl acid phosphate, di-isobehenyl acid phosphate, di-octyldecyl acid phosphate, di-octyldodecyl acid phosphate, di-isobutyl acid phosphate, di-2-ethylhexyl acid phosphate, di-isodecyl acid phosphate, di-tridecyl acid phosphate, di-oleyl acid phosphate, di-myristyl acid phosphate, di-palmityl acid phosphate, etc. Among them, from a viewpoint, for example, of non-crystallinity and molecular chain entanglement with the lubricant base oil, oleyl acid phosphate and isostearyl acid phosphate are preferred.

The molecular weight of the composition (b1) is preferably 3,000 or lower because the compatibility with the high-consistency material is improved by fine dispersion. The molecular weight of the composition (b1) is more preferably 2,500 or lower. Further, the molecular weight of the composition (b1) is preferably 80 or higher, and more preferably 100 or higher from a viewpoint, for example, of inhibiting separation due to increased concentration of the polar group. The molecular weight can be evaluated by calculation.

The content of the composition (b1) is preferably within a range of 30:70 to 98:2 in a mass ratio (A):(b1) of the high-consistency material (A) to the composition (b1). When the content of the composition (b1) is 2 mass % or higher with respect to the total of (A) and (b1), the present protection composition shows excellent adhesion to a metal, is hard to leak from a metal surface under the high temperature conditions, and shows more excellent effect of stably protecting the metal surface. When the content of the composition (b1) is 70 mass % or lower with respect to the total of (A) and (b1), the present protection composition forms a film having a sufficient thickness to exhibit more excellent anticorrosion property. The mass ratio (A):(b1) of the high-consistency material (A) to the composition (b1) is preferably within a range of 60:40 to 95:5 and more preferably within a range of 70:30 to 90:10 from a viewpoint of having a sufficient film thickness and adhesion to a metal.

The compound (b2) is a phosphate ester not containing salt such as a metal salt and an amine salt. Thus, the phosphorus composition (B) contains the compound (b2) containing a phosphate ester along with the composition (b1) containing a metal or an amine. The phosphorus compositions such as (b1) and (b2) may be bonded with amide compounds by hydrogen bonds, whereby formation of gel by aggregation of the amide compound in the high-consistency material (A) is delayed (or proceeds at a lower temperature). When the phosphorus composition contains only the composition (b1) or the compound (b2), the formation of gel may be delayed, but the time period from the beginning to ending of the formation of gel is short, and thus the range of the temperature at which the amide compounds aggregate is small. When the amide compounds aggregate quickly in a small range of temperature, the density of the network structure of the gel tends to be high. As the density is higher, the network structure of the gel is more susceptible to deformation and the present protection composition is likely to cause deformation or flowing when it is placed in an environment of a large temperature change with an external load such as pressure due to destruction of the network structure of the gel. Since the phosphorus composition (B) contains both the composition (b1) and the compound (b2), the gel may be formed at a variety of temperatures, and a range of temperatures in which the amide compounds aggregate is broadened while the effect of the composition (b1) (i.e., adhesion improvement) is maintained. Thus, the network structure of the gel obtains a certain level of flexibility, whereby the surface protection composition obtains an enhanced flexibility and becomes hard to deform or flow due to expansion or shrinkage of the material even placed in an environment of a large temperature change with a load. Consequently, the surface protection composition can become hard to deform or flow even placed in an environment of a large temperature change with a load and protect a metal surface stably.

The compound (b2) preferably has a lower molecular weight than the composition (b1). When the phosphorus composition does not contain salt or has a lower molecular weight, the temperature at which the gel is formed may be lowered. Therefore, when the phosphorus composition contains the compound (b2) having a smaller molecular lower than the composition (b1), the range of the temperature at which the amide compounds aggregate is further broadened, and the network structure of the gel obtains more flexibility. From this viewpoint, the molecular weight of the compound (b2) is preferably 1500 or lower.

In the compound (b2), $R^{17}$ to $R^{19}$ each represent independently a saturated or unsaturated hydrocarbon group having 1 to 25 carbon atoms. They may be linear, cyclic, or branched. Further, $R^{17}$ to $R^{19}$ may have an ether, ester, ketone, amide, or urethane bond.

From a viewpoint of having preferable viscosity and solubility, a compound having a hydrocarbon group having 1 to 25 carbon atoms is preferred as the compound (b2), and a compound having a hydrocarbon group having 5 to 22 carbon atoms is more preferred.

More specific examples of the hydrocarbon group in the compound (b2) include oleyl group, stearyl group, behenyl group, isostearyl group, 2-ethylhexyl group, butyloctyl group, isomyristyl group, isocetyl group, hexyldecyl group, octyldecyl group, octyldodecyl group, and isobehenyl group.

Further, the specific examples of the compound includes triisooctyl phosphite, tris(2-ethylhexyl)phosphate, trioleyl phosphate, and tribehenyl phosphate. Among them, tris(2-ethylhexyl)phosphate is preferred from a viewpoint of having preferable viscosity and solubility.

The content of the compound (b2) is preferably within a range of 70:30 to 99.9:0.1 in a mass ratio {(A)+(b1)}:(b2) of the total of the high-consistency material (A) and the composition (b1) to the compound (b2). When the content of the compound (b2) with respect to the total of the high-consistency material (A), the composition (b1), and the compound (b2) is 0.1 mass % or higher, the present protection composition becomes hard to deform or leak even placed under environments of a large temperature change with an external load such as pressure and thus shows more excellent effect of stably protecting a metal surface. When the content of the compound (b2) in the total of the high-consistency material (A), the composition (b1), and the compound (b2) is 30 mass % or lower, the present protection composition shows excellent adhesion to a metal, becomes hard to leak from the metal surface under the high temperature conditions, and shows more excellent effect of stably protecting the metal surface. Further, the present protection composition forms a film having a sufficient thickness to exhibit more excellent anticorrosion property. The mass ratio {(A)+(b1)}:(b2) of the total of the high-consistency material (A) and the composition (b1) to the compound (b2) is preferably within a range of 80:20 to 99.9:05, and more preferably within a range of 90:10 to 99:1.

The qualitative or quantitative analysis of the lubricant base oil and the amide compound of the high-consistency material (A), the composition (b1), and the compound (b2) of the present protection composition may be performed by the GC-MS analysis, for example.

The phosphorus composition (B) may be formed by mixing one or more compounds represented by the general formulae (1) and (2), one or more metals and/or one or more amines, and one or more compounds represented by the general formula (3). The phosphorus composition (B) may also be formed by mixing the composition (b1) and the compound (b2).

The metal source for the composition (b1) includes a metal hydroxide, a metal carboxylate, etc. Examples of the carboxylic acid forming the metal carboxylate include salicylic acid, benzoic acid, and phthalic acid. The metal carboxylate may be a neutral salt, may be a basic salt obtained through heating of an excess amount of metal, metal oxide, or metal hydroxide in the presence of water, or may be a hyperbasic salt obtained through reaction of a metal, metal oxide or metal hydroxide in the presence of carbon dioxide gas, boric acid, or borate salt. Among them, hyperbasic salicylic acid or the like is preferred from a viewpoint of the solubility and reactivity of metal ions during the reaction.

It is preferred that the metal source for the composition (b1) includes (D) alkali metal or alkaline earth metal salicylate having an alkyl or alkenyl group having 10 to 40 carbon atoms or (hyper)basic salts thereof. The alkali metal or the alkaline earth metal of (D) includes, for example, sodium, potassium, magnesium, barium, and calcium. Among them, calcium is more preferred.

Examples of the alkyl group having 10 to 40 carbon atoms in (D) include decyl group, undecyl group, dodecyl group, tridecyl group, tetradecyl group, pentadecyl group, hexadecyl group, heptadecyl group, and octadecyl group. They may be either linear or branched.

Examples of the alkenyl group having 10 to 40 carbon atoms in (D) include decenyl group, undecenyl group, dodecenyl group, tridecenyl group, tetradecenyl group, pentadecenyl group, hexadecenyl group, heptadecenyl group, and octadecenyl group. They may be either linear or branched, and the position of the double bond is not limited.

The method of producing the ingredient (D) is not particularly limited, and a known method of manufacturing a monoalkyl salicylate may be employed. For example, the ingredient (D) may be obtained by reacting monoalkyl salicylic acid with a metal base such as an oxide or hydroxide of an alkali metal or an alkaline earth metal, or by changing the monoalkyl salicylic acid to an alkaline metal salt such as a sodium salt or a potassium salt, and performing a metal-exchange reaction between the alkaline metal salt and an alkaline earth metal salt. The monoalkyl salicyclic acid may be obtained from phenol as a starting material by carrying out alkylation of the phenol using an olefin having 10 to 40 stoichiometric carbon atoms followed by carboxylation with carbon dioxide. The monoalkyl salicyclic acid may also be obtained from salicylic acid as a starting material by carrying out alkylation of the salicylic acid using an olefin having stoichiometric 10 to 40 carbon atoms.

The (hyper)basic salt is preferred as the ingredient (D). In this case, the metal ratio of inorganic compounds such as calcium carbonate to organic compounds is preferably within a range of 1 to 7.5, more preferably within a range of 1 to 5, and still more preferably within a range of 1 to 3.5. The metal ratio is defined as: [the valence of the metal element of the (hyper) basic salt]×[the content of the metal element (mol %)]/[the content of soap group (mol %)]. The metal element includes, for example, calcium, magnesium, etc. The soap group includes, for example, salicylic acid group.

One or more types of the ingredients (D) may be mixed arbitrarily. From a viewpoint of obtaining an excellent effect of protecting a metal surface, the content of the ingredient (D) is preferably 0.005 mass % or higher in the amount of the metal element with respect to the total of the compositions. The content is preferably 3.0 mass % or lower from a viewpoint of avoiding difficulty in obtaining the effect of protecting a metal surface corresponding to the content of (D).

The present protection composition may be formed by mixing the high-consistency material (A) and the phosphorus composition (B). The present protection composition may also be formed by mixing the lubricant base oil, the amide compound, and the phosphorus composition (B). The present protection composition may also be formed by mixing the lubricant base oil, the amide compound, one or more compounds represented by the formulae (1) and (2), one or more metals and/or one or more amines, and one or more compounds represented by the formula (3). From a viewpoint of reliably forming the composition in a desired content ratio, the present protection composition is preferably formed by mixing the high-consistency material (A) and the phosphorus composition (B).

To the present protection composition, an organic solvent, a stabilizer, a corrosion inhibitor, a dye, a viscosity improver, a metal deactivating agent, a nucleating agent, a filler, etc. can be added in addition to the high-consistency material (A), and the phosphorus composition (B) as long as the function of the present protection composition is not deteriorated.

When the present protection composition contains a metal deactivating agent, the effect of protecting a metal surface is further improved. Examples of the metal deactivating agent include a metal deactivating agent containing a nitrogen-containing heterocycle in a molecule. As the metal deactivating agent containing a nitrogen-containing heterocycle in a molecule, ones usually used in the lubricant base oil may be used; one or more selected from benzotriazole-based compounds, tolyltriazole-based compounds, benzothiazole-based compounds, thiadiazole-based compounds, and imidazole-based compounds may be preferably used. The metal deactivating agent preferably contains a hydrocarbon group having 4 or more carbon atoms, which leads to stable solubility of the present protection composition. Further, the metal deactivating agent preferably contains a linear or branched hydrocarbon group having 8 or more carbon atoms, which leads to excellent formability of a surface protection film to be formed with the present protection composition.

From a viewpoint of obtaining an excellent effect of protecting a metal surface, the present protection composition preferably contains 0.01 mass % or higher of the metal deactivating agent with respect to the total of the compositions. The content is more preferably 0.1 mass % or higher, and still more preferably 0.2 mass % or higher. From a viewpoint of avoiding difficulty in obtaining the effect of protecting a metal surface corresponding to the content of the metal deactivating agent, the present protection composition preferably contains 30 mass % or lower of the metal deactivating agent with respect to the total of the compositions. The content is more preferably 25 mass % or lower, and still more preferably 20 mass % or lower.

The nucleating agent promotes crystallization of the amide compound contained in the high-consistency material. The nucleating agent suppresses formation of a nonuniform phase by promoting crystallization of the amide compound in a melted state after application of the present protection composition. By suppressing the formation of a nonuniform phase, cracking in the film during cooling after application of the present protection composition is suppressed and a uniform film is formed. The nucleating agent has a strong effect especially on the composition having improved heat resistance with the use of an amide compound having a high melting point.

The cracking due to the nonuniform phase is caused in a composition in which a high-consistency material (A) is blended with a phosphorus composition (B). For the high-consistency material containing only the lubricant base oil and the amide compound, cracking is not caused after application of the material in a melted state. Accordingly, it is not necessary to add the nucleating agent, for the purpose of preventing cracking, to the high-consistency material containing the lubricant base oil and the amide compound. However, since adhesion to the metal surface can not be ensured only by the high-consistency material containing the lubricant base oil and the amide compound, peeling occurs on the surface of the metal when volume change (shrinkage) occurs in the high-consistency material upon cooling from the temperature during coating to the normal temperature, thereby making the coated surface nonuniform.

Such a nucleating agent is not particularly limited so long as the agent promotes crystallization of the amide compound; however, inorganic particles containing a silicate or magnesia is preferred. Examples of the inorganic particles containing the silicate or magnesia include talc, kaolinite, montmorillonite, and magnesium oxide. They may be used alone or two or more of them may be used in combination as the nucleating agent. Among the nucleating agents, talc is particularly preferred.

Talc is a layered mineral containing silicic acid, magnesia and water of crystallization, and the layering planes thereof are easy to be peeled. Talc, having a tendency to form a fresh magnesia portion by peeling, presumably tends to act on the amide compound, which is highly polar and slightly basic.

The average particle diameter of the nucleating agent is preferably 20 µm or smaller, more preferably 15 µm or smaller, and still more preferably 10 m or smaller. When the particle diameter of the nucleating agent is 20 µm or smaller, agglomeration of particles is suppressed and nonuniformity of the film due to the particles is suppressed. Further, an average particle diameter of the nucleating agent is preferably 0.1 µm or larger, more preferably 0.5 µm or larger, and still more preferably 1.0 µm or larger. When the particle diameter of the nucleating agent is 0.1 μm or larger, it is excellent in dispersibility in the high-consistency material containing the lubricant base oil and the amide compound and in handleability. The average particle diameter of the nucleating agent can be measured by a dynamic light scattering method, laser diffraction/scattering method, picture imaging, etc.

The content of the nucleating agent is preferably 0.01 mass parts or more with respect to 100 mass parts of the total of the ingredients in the surface protection composition except the nucleating agent. The content is more preferably 0.1 mass parts or more, and still more preferably 0.5 mass parts or more. When the content of the nucleating agent is 0.01 mass parts or more, the nucleating agent provides an excellent phase homogenization effect due to promotion of crystallization of the amide compound. Further, the content of the nucleating agent is preferably 15 mass parts or less with respect to 100 mass parts of the total of the ingredients in the surface protection composition except the nucleating agent. The content is more preferably 10 mass parts or less, and still more preferably 5.0 mass parts or less. When the content of the nucleating agent is 15 mass parts or less, agglomeration of the particles is suppressed and nonuniformity of the film caused by particles is suppressed.

The specific gravity of the nucleating agent is preferably within a range of 0.5 to 6.0. It is more preferably within a range of 0.7 to 5.0. When the specific gravity of the nucleating agent is within the range of 0.5 to 6.0, precipitation and floating of the nucleating agent can be suppressed, dispersibility in the high-consistency material containing the lubricant base oil and the amide compound is excellent, and the effect of phase homogenization due to promotion of crystallization of the amide compound is excellent.

The present protection composition is a low viscosity liquid at a high temperature, and thus application of the composition is easy. The present protection composition becomes a gel in the process of cooling after application, and thus flowing of the composition is suppressed. The temperature at which the composition is liquefied varies according to the melting point of the amide compound contained in the composition. By selecting the amide compound, a highly heat resistant film may be formed since the composition keeps the stable gel state at a temperature below the melting point. Further, the present protection composition may be firmly kept on the metal surface due to metal adsorption property of the composition (b1), and thus flowing of the composition is suppressed even at a high temperature. By containing the composition (b1) and the compound (b2), the present protection composition is hard to deform or flow even placed under environments of a large temperature change with an external load such as pressure, and stably protects a metal surface.

The surface of a material to be coated is coated with the present protection composition by applying the present protection composition onto the surface of the material or immersing the material into the present protection composition.

The high-consistency film formed on the surface of the material preferably has a thickness of 100 m or smaller from a viewpoint of preventing outward flow or preventing leakage from the coated portion. The thickness is more preferably 50 μm or smaller. Meanwhile, the lower limit of the thickness of the high-consistency film is preferably defined from a viewpoint of mechanical strength, etc. The lower limit of the film thickness is, for example, 0.5 μm, 2 μm, or 5 μm.

The present protection composition prevents corrosion, etc. For example, the present protection composition covers the surface of a metal part to be protected with closely contacting the surface, thereby preventing corrosion of the metal part. For example, a terminal-fitted electric wire may be covered with the present protection composition for preventing corrosion.

Next, a terminal-fitted electric wire according to the present invention is to be described.

A terminal-fitted electric wire according to the present invention is an electric wire in which a terminal is connected to the conductor end of the insulation electric wire, and the electric connection portion between the terminal and the electric wire conductor is covered with the high-consistency film of the present protection composition including the high-consistency material containing the lubricant base oil and the amide compound, and the composition of the specific phosphorus composition and the metal. Thus, corrosion at the electric connection portion is prevented.

Figure 2:
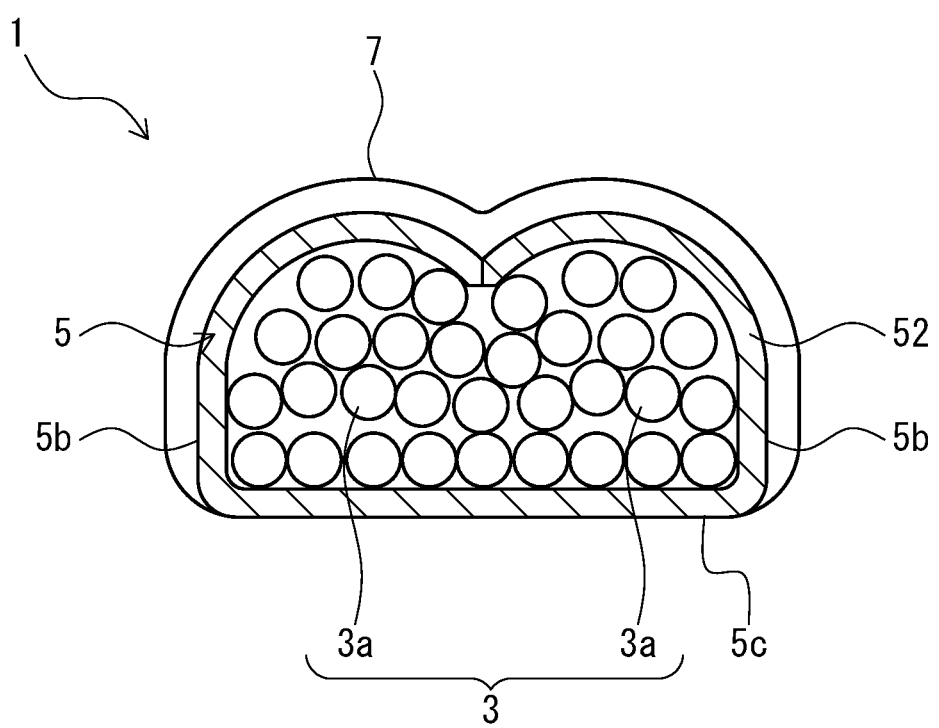
FIG. 2 is a longitudinal cross sectional view along line A-A in FIG. 1.

FIG. 1 is a perspective view of a terminal-fitted electric wire according to a preferred embodiment of the present invention, and FIG. 2 is a vertical cross sectional view along line A-A in FIG. 1. As illustrated in FIG. 1 and FIG. 2, in a terminal-fitted electric wire 1, an electric wire conductor 3 of a covered electric wire 2 covered with an insulation covering (insulator) 4 and a terminal 5 are electrically connected through an electric connection portion 6.

The terminal 5 has a tab-shaped connection part 51 formed by an elongate flat plate to be connected with a mating terminal, and an electric wire fixing portion 54 containing a wire barrel 52 and an insulation barrel 53 formed at the extended end of the connection portion 51. The terminal 5 can be formed (or fabricated) to a predetermined shape by pressing a plate material made of a metal.

In the electric connection portion 6, the insulation covering 4 at the end of the covered electric wire 2 is stripped to expose the electric wire conductor 3, and the exposed electric wire conductor 3 is press-bonded to one side of the terminal 5 to connect the covered electric wire 2 with the terminal 5. The wire barrel 52 of the terminal 5 is crimped over the electric wire conductor 3 of the covered electric wire 2 to electrically connect the electric wire conductor 3 with the terminal 5. Further, the insulation barrel 53 of the terminal 5 is crimped over the insulation covering 4 of the covered electric wire 2.

In the terminal-fitted electric wire 1, an area surrounded by a dotted chain is covered with a high-consistency film 7 obtained from the present protection composition. Specifically, an area from the surface portion of the terminal 5 ahead of the front end of the electric wire conductor 3 exposed from the insulation covering 4 to the surface portion of the insulation covering 4 behind the backward end of the electric wire conductor 3 exposed from the insulation covering 4 is covered with the high-consistency film 7. That is, beyond the front end 2a of the covered electric wire 2, the terminal-fitted electric wire 1 is covered with the high-consistency film 7 in an area that protrudes slightly from the front end of the electric wire conductor 3 to the connection portion 51 of the terminal 5. The front end 5a of the terminal 5 of the terminal-fitted electric wire 1 is also covered with the high-consistency film 7 in an area that protrude slightly from the end of the insulation barrel 53 to the side of the insulation covering 4 of the covered electric wire 2. Then, as shown in FIG. 2, the lateral side 5b of the terminal 5 is also covered with the high-consistency film 7. The back surface 5c of the terminal 5 may or may not be covered with the high-consistency film 7. The peripheral end of the high-consistency film 7 contains a portion in contact with the surface of the terminal 5, a portion in contact with the surface of the electric wire conductor 3, and a portion in contact with the surface of the insulation covering 4.

In this way, the electric connection portion 6 is covered with the high-consistency film 7 at a predetermined thickness along the shape of the outer periphery of the terminal 5 and the covered electric wire 2. Thus, a portion of the electric wire 2 from which the electric wire conductor 3 is exposed is completely covered with the high-consistency film 7 so as not to be exposed to the outside. Accordingly, the electric connection portion 6 is completely covered with the high-consistency film 7. Since the high-consistency film 7 has excellent adhesion to all of the electric wire conductor 3, the insulation covering 4, and the terminal 5, the high-consistency film 7 prevents intrusion of moisture, etc. from the outside to the electric wire conductor 3 and the electric connection portion 6, which may cause corrosion of the metal portions. Further, since the high-consistency film 7 is excellent in adhesion, a gap is less likely to be formed between the high-consistency film 7 and any of the electric wire conductor 3, the insulation covering 4, and the terminal 5 at the peripheral end of the high-consistency film 7 even when the electric wire is bent, for example, in the process from the production of the wire harness to the attachment to a vehicle, thereby maintaining the waterproofness and corrosion protection function.

The present protection composition forming the high-consistency film 7 is coated for a predetermined range. For the application of the present protection composition forming the high-consistency film 7, known methods such as dripping, coating, etc. can be used.

The high-consistency film 7 is formed at a predetermined thickness in a predetermined area. The thickness is, preferably, within a range of 0.01 to 0.1 mm. If the high-consistency film 7 is excessively thick, it is difficult to insert the terminal 5 into a connector. If the high-consistency film 7 is excessively thin, the corrosion protection function tends to be lowered.

The electric wire conductor 3 of the covered electric wire 2 is a stranded wire composed of a plurality of wires 3a. In this case, the stranded wire may be composed of a single type of metal wires or two or more types of metal wires. Further, the stranded wire may also be composed of organic fibers in addition to metal wires. The stranded wire composed of a single type of metal wires means that all metal wires forming the stranded wire are formed from the same metal material, while the stranded wire composed of two or more types of metal wires means that the stranded wire contains metal wires formed from different metal materials. The stranded wire may also include reinforcing wires (tension members) for reinforcing the covered electric wire 2.

Examples of the material for metal wire forming the electric wire conductor 3 include copper, copper alloys, aluminum, aluminum alloys, or materials formed by applying various platings to the materials described above. The material for the metal wire as the reinforcing wires includes, for example, copper alloys, titanium, tungsten, stainless steels, etc. Further, the organic fibers as the reinforcing wire include, for example, KEVLAR. Metal wires forming the electric wire conductor 3 are preferably aluminum, aluminum alloys or materials formed by applying various types of plating to the materials described above from a viewpoint of reducing the weight.

The material for the insulation covering 4 includes, for example, rubber, polyolefin, PVC, thermoplastic elastomer, etc. They may be used alone or two or more of them may be used in combination. Various additives may be added as required to the material of the insulation covering 4. Examples of the additives include flame retardants, fillers, colorants, etc.

The material for the terminal 5 (material for a substrate) includes various copper alloys, copper, etc. in addition to generally used brass. The surface of the terminal 5 may be applied with plating of various metals such as tin, nickel, and gold partially (for example, to contacts) or entirely.

While a terminal is press-bonded to the end of the electric wire conductor in the terminal-fitted electric wire 1 illustrated in FIG. 1, other known electric connection methods such as welding may also be used instead of the press-bonding connection.

EXAMPLE

The present invention is to be described by way of examples but the present invention is not restricted to the examples.

Preparation of High-Consistency Material (A)

High-consistency materials were prepared by mixing lubricant base oils and amide compounds according to content ratio (parts by mass) shown in Table 1.

Lubricant base oil A:Mineral type base oil (kinematic viscosity=4.0 $mm^2$/s (100° C.)).
    Lubricant base oil B:Mineral type base oil (kinematic viscosity=11.1 $mm^2$/s (100° C.)).
    Lubricant base oil C: Synthetic type base oil (kinematic viscosity=100.0 $mm^2$/s (100° C.)).
    Amide compound a:Ethylene bis-stearylamide "SLI-PACKS E" (melting point 150° C., molecular weight 592) manufactured by Nippon Kasei Chemical Co. Ltd.
    Amide compound b:Ethylene bis-erucic acid amide "SLI-PACKS R" (melting point 120° C., molecular weight 700) manufactured by Nippon Kasei Chemical Co. Ltd.

Preparation of Composition (b1)

<Preparation Example 1> OL-Ca

Into a 500 mL flask, 50 g (acid value: 0.163 mol) of oleyl acid phosphate ("Phoslex A18D" manufactured by SC Organic Chemical Co., Ltd., molecular weight: 467 (average), acid value: 183 mg KOH/g) and 50 mL of methanol were put and stirred at room temperature to form a uniform solution. Into the solution, 6.04 g (0.0815 mol) of calcium hydroxide was added. The suspension was stirred for 24 hours at room temperature, and filtered after confirming that there was no calcium hydroxide precipitates. Then, methanol and generated water were distilled off under a reduced pressure by a rotary evaporator. Then, after adding 50 mL of toluene, the generated water was distilled off by azeotropy through vacuum distillation to obtain a clear and viscous aimed product.

<Preparation Example 2> IS-Ca

Into a 500 mL flask, 50 g (acid value: 0.159 mol) of isostearyl acid phosphate ("Phoslex A180L" manufactured by SC Organic Chemical Co., Ltd., molecular weight: 487 (average), acid value: 178 mg KOH/g) and 50 mL of methanol were put and stirred at room temperature to form a uniform solution. Into the solution, 5.89 g (0.0795 mol) of calcium hydroxide was added. The suspension was stirred for 24 hours at room temperature, and filtered after confirming that there was no calcium hydroxide precipitates. Then, methanol and generated water were distilled off under a reduced pressure by a rotary evaporator. Then, after adding 50 mL of toluene, the generated water was distilled off by azeotropy through vacuum distillation to obtain a clear and viscous aimed product.

<Preparation Example 3> IS-SA-Ca

Into a 500 mL flask, 100 g (acid value: 0.317 mol) of isostearyl acid phosphate ("Phoslex A180L" manufactured by SC Organic Chemical Co., Ltd., molecular weight: 487 (average), acid value: 178 mg KOH/g) and 116 g of superbasic calcium alkyl salicylate were put and stirred at 120° C. for 3 hours and then cooling it to a room temperature to obtain an aimed viscous brown product.

<Preparation Example 4> IS-TEA

Into a 500 mL flask, 50 g (acid value: 0.159 mol) of isostearyl acid phosphate ("Phoslex A180L" manufactured by SC Organic Chemical Co., Ltd., molecular weight: 487 (average), acid value: 178 mg KOH/g) and 50 mL of methanol were put and stirred at room temperature to form a uniform solution. Into the solution, 16.1 g (0.159 mol) of triethylamine was added. The suspension was stirred for 24 hours at room temperature. Then, methanol and generated water were distilled off under a reduced pressure by a rotary evaporator. Then, after adding 50 mL of toluene, the generated water was distilled off by azeotropy through vacuum distillation to obtain a clear and viscous aimed product.

Preparation of Surface Protection Composition

Surface protection compositions were prepared by mixing the high-consistency material (A), the composition (b1) and the compound (b2) at the content ratio (parts by mass) shown in Table 1 while heated at 160° C. The compound (b2) is as shown below: (b2)
TOP: trioctyl phosphate
TPP: triphenyl phosphate
TBEP: tri(butoxyethyi)phosphate
(Evaluation of Endurance)

Onto the center portion of a flat copper plate of 100 mm×100 mm, 5 mg of the surface protection composition in a liquefied state heated at 160° C. was applied to form a high-consistency film (thickness: 30 μm), and a slide glass having a weight of 4.5 g (thickness: 1 mm) was placed on the film. The condition of the high-consistency film underneath the slide glass was visually observed with naked eyes through the slide glass and then the film was put into a thermal shock test machine to undergo a thermal shock test (the film was placed at −40° C. for one hour and then it was placed at 85° C. for one hour in a cyclic manner to repeat the cycle for 10 times). After undergoing the thermal test, the condition of the high-consistency film underneath the slide glass was visually observed again with naked eyes through the slide glass. The films for which no changes were found in condition after the thermal shock test were evaluated as "good" in endurance and those for which changes were found in condition after the thermal shock test, such as flattening or flowing of the high-consistency film, were evaluated as "bad" in endurance.

TABLE 1

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| High-consistency material(A) | Lubricant base oil a | 55 | 55 | 55 | 55 | — | — | — | — | — | — | — |
| | Lubricant base oil b | — | — | — | — | 55 | 55 | 55 | 55 | 55 | 55 | 55 |
| | Lubricant base oil c | — | — | — | — | — | — | — | — | — | — | — |
| | Amide compound a | 30 | 30 | 30 | 30 | 30 | 30 | 30 | — | 30 | 30 | 30 |
| | Amide compound b | — | — | — | — | — | — | — | 30 | — | — | — |
| (b-1) | CL-Ca | 15 | — | — | — | — | — | — | — | — | — | — |
| | IS-Ca | — | 15 | — | — | — | — | — | — | — | — | — |
| | IS-TEA | — | — | 15 | — | — | — | — | — | — | — | — |
| | IS-SA-Ca | — | — | — | 15 | 15 | 15 | 15 | 15 | 15 | 15 | 15 |
| (b-2) | TOP | 5 | 5 | 5 | 5 | 5 | — | — | 5 | 5 | 5 | 5 |
| | TPP | — | — | — | — | — | 5 | — | — | — | — | — |
| | TBEP | — | — | — | — | — | — | 5 | — | — | — | — |
| Metal deactivating agent | | 1 | 1 | 1 | 1 | 1 | 1 | 1 | 1 | — | 1 | — |
| Nucleating agent | | 5 | 5 | 5 | 5 | 5 | 5 | 5 | 5 | 5 | — | — |
| Evaluation of endurance | | Good | Good | Good | Good | Good | Good | Good | Good | Good | Good | Good |

| | | Examples | | | | | | | Comparative Examples | | | |
|---|---|---|---|---|---|---|---|---|---|---|---|---|
| | | 12 | 13 | 14 | 15 | 16 | 17 | 18 | 1 | 2 | 3 | 4 |
| High-consistency material(A) | Lubricant base oil a | — | — | — | — | — | — | — | — | — | — | — |
| | Lubricant base oil b | 63 | 23 | 55 | 55 | — | — | — | 85 | 65 | 55 | 55 |
| | Lubricant base oil c | — | — | — | — | 55 | 63 | 23 | | | | |
| | Amide compound a | 34 | 12 | 30 | 30 | 30 | 34 | 12 | — | 35 | 30 | 30 |

TABLE 1-continued

|   |   |   |   |   |   |   |   |   |   |   |   |   |
|---|---|---|---|---|---|---|---|---|---|---|---|---|
|   | Amide compound b | — | — | — | — | — | — | — | — | — | — | — |
| (b-1) | CL-Ca | — | — | — | — | — | — | — | — | — | — | 7 |
|   | IS-Ca | — | — | — | — | — | — | — | — | — | — | — |
|   | IS-TEA | — | — | — | — | — | — | — | — | — | — | — |
|   | IS-SA-Ca | 3 | 65 | 15 | 15 | 15 | 3 | 65 | 15 | — | 15 | 8 |
| (b-2) | TOP | 5 | 5 | 0.2 | 25 | 5 | 5 | 5 | 5 | — | — | — |
|   | TPP | — | — | — | — | — | — | — | — | — | — | — |
|   | TBEP | — | — | — | — | — | — | — | — | — | — | — |
| Metal deactivating agent | | 1 | 1 | 1 | 1 | 1 | 1 | 1 | 1 | 1 | 1 | 1 |
| Nucleating agent | | 5 | 5 | 5 | 5 | 5 | 5 | 5 | 5 | 5 | 5 | 5 |
| Evaluation of endurance | | Good | Good | Good | Good | Good | Good | Good | Bad | Bad | Bad | Bad |

As for Examples, no changes are found in the condition after the endurance test described above, and they are evaluated as good in endurance. Meanwhile, as for Comparative Examples, changes are found in the condition after the endurance test, and they are evaluated as "bad" in endurance. In Comparative Example 1, the lubricant base oil is contained but the amide compound is not contained, and thus flowing of the materials is observed in the endurance test. In Comparative Example 2, the high-consistency material (A) is contained but the composition (b1) is not contained, and thus deformation of the high-consistency film is observed. In each of Comparative Examples 3 and 4, the high-consistency material (A) and the composition (b1) are contained but the compound (b2) is not contained, and thus deformation of the high-consistency film is observed. Hence, the surface protection composition according to the present invention is hard to deform or flow even placed under environments of a large temperature change with an external load such as pressure, and stably protects a metal surface.

The embodiment of the present invention has been described specifically but the present invention is no way restricted to the embodiment described above but can be modified variously within a range not departing from the gist of the present invention.

The invention claimed is:

1. A surface protection composition comprising:
a high-consistency material (A) comprising:
  a lubricant base oil; and
  an amide compound; and
a phosphorus composition (B), the phosphorus composition (B) comprising:
  a composition (b1) comprising:
    one or more selected from compounds represented by the general formulae (1) and (2); and
    one or more metals and/or one or more amines; and
  one or more compounds (b2) represented by the general formula (3):

(1)

(2)

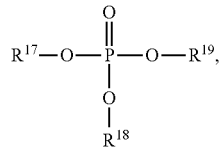

(3)

where $X^1$ to $X^7$ each represent independently an oxygen atom or a sulfur atom, $R^{11}$ to $R^{13}$ each represent independently a hydrogen atom or a hydrocarbon group having 1 to 30 carbon atoms, among which at least one is a hydrocarbon group having 1 to 30 carbon atoms and at least one is a hydrogen atom, $R^{14}$ to $R^{16}$ each represent independently a hydrogen atom or a hydrocarbon group having 1 to 30 carbon atom, among which at least one is a hydrocarbon group having 1 to 30 carbon atom and at least one is a hydrogen atom, and $R^{17}$ to $R^{19}$ each represent independently a hydrocarbon group having 1 to 25 carbon atoms,
wherein a mass ratio {(A)+(b1)}:(b2) of the total of the high-consistency material (A) and the composition (b1) to the compound (b2) is within a range of 70:30 to 99.9:0.1.

2. The surface protection composition according to claim 1, wherein the compound (b2) has a lower molecular weight than the composition (b1).

3. The surface protection composition according to claim 1, wherein the amide compound comprises one or more selected from compounds represented by the general formulae (4) to (6):

(4)

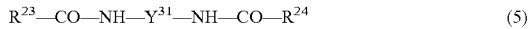

(5)

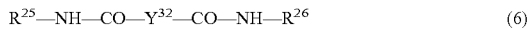

(6)

where $R^{21}$ to $R^{26}$ each represent independently a saturated or unsaturated linear hydrocarbon group having 5 to 25 carbon atoms except that $R^{22}$ may be hydrogen, and $Y^{31}$ and $Y^{32}$ each represent a divalent hydrocarbon group having 1 to 10 carbon atoms selected from an alkylene group and a phenylene group having 1 to 10 carbon atoms, or an alkylphenylene group having 7 to 10 carbon atoms.

4. The surface protection composition according to claim 1, wherein the amide compound is a fatty acid amide having a melting point within a range of 20° C. to 200° C.

5. The surface protection composition according to claim 1, wherein the compound represented by the general formulae (1) and (2) has one or more branched structures or one or more carbon-carbon double bond structures in the structure of the hydrocarbon groups.

6. The surface protection composition according to claim 1, wherein the metal in the composition (b1) is at least one selected from alkali metals, alkaline earth metals, aluminum, titanium, and zinc.

7. The surface protection composition according to claim 1, wherein the composition (b1) has a molecular weight of 3000 or lower.

8. The surface protection composition according to claim 1, wherein a mass ratio (A):(b1) of the high-consistency material (A) to the composition (b1) is within a range of 30:70 to 98:2.

9. The surface protection composition according to claim 1, wherein the composition covers a surface of a metal component with closely contacting the surface, preventing corrosion of the metal component.

10. A terminal-fitted electric wire, wherein an electric connection part between a terminal and an electric conductor is covered with the surface protection composition according to claim 1.

* * * * *